(12) United States Patent
Niglas et al.

(10) Patent No.: US 11,724,676 B2
(45) Date of Patent: Aug. 15, 2023

(54) TRAILER DETECTION AND CONTROL MODULE

(71) Applicant: Bendix Commercial Vehicle Systems LLC, Elyria, OH (US)

(72) Inventors: Paul C. Niglas, Elyria, OH (US); Brian J. Riley, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 953 days.

(21) Appl. No.: 16/674,252

(22) Filed: Nov. 5, 2019

(65) Prior Publication Data

US 2021/0129810 A1    May 6, 2021

(51) Int. Cl.
    B60T 8/17    (2006.01)
    B60T 8/30    (2006.01)
    B60T 8/26    (2006.01)
    B60D 1/24    (2006.01)

(52) U.S. Cl.
    CPC ............ B60T 8/1708 (2013.01); B60D 1/245 (2013.01); B60T 8/266 (2013.01); B60T 8/303 (2013.01)

(58) Field of Classification Search
    CPC ........ B60T 8/1708; B60T 8/303; B60T 8/266; B60D 1/245
    See application file for complete search history.

(56) References Cited

U.S. PATENT DOCUMENTS

| | | | |
|---|---|---|---|
| 4,030,757 A | 6/1977 | Durling | |
| 5,061,015 A | 10/1991 | Cramer et al. | |
| 5,445,440 A | 8/1995 | Plantan | |
| 6,206,481 B1 | 3/2001 | Kaisers et al. | |
| 8,794,718 B2 | 8/2014 | Bensch et al. | |
| 8,864,247 B2 | 10/2014 | Hilberer | |
| 2015/0239441 A1* | 8/2015 | Klostermann | ........ B60T 15/028 303/7 |
| 2019/0263371 A1* | 8/2019 | Goers | ................... B60T 15/027 |
| 2020/0079341 A1* | 3/2020 | Van Thiel | ............ B60T 8/3605 |
| 2020/0223414 A1* | 7/2020 | Brütt | ......................... B60T 7/20 |
| 2021/0129810 A1* | 5/2021 | Niglas | ...................... B60D 1/62 |
| 2021/0197780 A1* | 7/2021 | Mueller | ..................... B60T 8/36 |

FOREIGN PATENT DOCUMENTS

| | | |
|---|---|---|
| CN | 2108661 U | 7/1992 |
| DE | 10 2017 007 781 A1 | 2/2019 |
| EP | 2 305 524 A1 | 4/2011 |
| EP | 2 371 641 B1 | 5/2014 |
| WO | 2018/172333 A1 | 9/2018 |
| WO | 2018/172340 A1 | 9/2018 |

* cited by examiner

Primary Examiner — Vishal R Sahni
(74) Attorney, Agent, or Firm — Reising Ethington P.C.

(57) ABSTRACT

A trailer control valve for a tractor includes a body defining a supply port and first and second delivery ports. The supply port is configured for fluid communication with a fluid source on the tractor. The first and second delivery ports are configured for fluid communication with glad-hand connectors through which fluid is supplied from the tractor to a trailer. A pressure sensing solenoid receives fluid signal from each of the first and second deliver ports and selectively passes fluid signal therefrom to a pressure sensor as a function of a brake control signal received by a controller that controls the pressure sensing solenoid.

21 Claims, 4 Drawing Sheets

TRAILER DETECTION AND CONTROL MODULE

BACKGROUND

This invention relates to a trailer control valve for a tractor-trailer. In particular, the invention relates to a trailer control valve that controls delivery of fluid to trailer brakes while providing protection for the tractor air supply.

Conventional tractors include components for generating and storing pressurized fluid and for routing and delivering that fluid to wheel brakes on the tractor and any trailers coupled to the tractor in order to release parking brakes and apply service brakes. These components include various valves that control routing and delivery of fluid from a fluid source to the brakes as well as multiple expensive pressure sensing components. To control routing and delivery of fluid to the trailers, the tractor typically includes a relay valve as well as a tractor protection valve. The relay valve increases the volume of fluid, and therefore the speed, at which fluid is delivered to, and exhausted from, the wheel brakes on the trailer in order to eliminate lag times between the commanded and actual application and release of the trailer brakes. The tractor protection valve transmits pneumatic signals relating to operation of the trailer wheel brakes from the tractor to the trailer while also protecting the fluid supply for the tractor in the event of a break in the fluid connection between the tractor and trailer. Although conventional relay and tractor protection valves and pressure sensors function well for their intended purpose, the use of separate relay and tractor protection valves increases the part count, cost and complexity of the fluid circuit on the tractor including the number of pneumatic connections.

The present innovation provides new and improved systems and methods that facilitate sensing trailer fluid supply and control pressures with reduced cost and complexity, which overcome the above-referenced problems and others.

SUMMARY

In accordance with one aspect, a trailer control valve for a tractor comprises a body defining a supply port and first and second delivery ports, the supply port configured for fluid communication with a fluid source on the tractor, the first delivery port in fluid communication with the supply port and configured for fluid communication with a first glad-hand connector through which fluid is supplied from the tractor to a trailer coupled to the tractor, the second delivery port configured for fluid communication with a second glad-hand connector through which fluid is supplied from the tractor to the trailer for trailer control. A relay valve is supported within the body, the relay valve including a valve member configured to move between a first position preventing fluid communication between the supply port and the second delivery port and a second position permitting fluid communication between the supply port and the second delivery port. A pressure sensing solenoid that receives fluid signal from the first and second delivery ports, and selectively switches between transmitting fluid signal from the first and second delivery ports as a function of a brake control signal received by a controller that controls the pressure sensing solenoid.

In accordance with another aspect, a trailer control valve for a tractor comprises a body defining a supply port and first and second delivery ports, the supply port configured for fluid communication with a fluid source on the tractor, the first delivery port in fluid communication with the supply port and configured for fluid communication with a first glad-hand connector through which fluid is supplied from the tractor to a trailer coupled to the tractor, the second delivery port configured for fluid communication with a second glad-hand connector through which fluid is supplied from the tractor to the trailer. The trailer control valve further comprises a relay valve supported within the body, the relay valve including a valve member configured to move between a first position preventing fluid communication between the supply port and the second delivery port and a second position permitting fluid communication between the supply port and the second delivery port. A pressure sensing solenoid receives fluid signal from the first and second delivery ports, and selectively switches between transmitting fluid signal from the first and second delivery ports as a function of the pressure of the fluid signal from the first delivery port. A single pressure sensor is in fluid communication with the pressure sensing solenoid and supported within the body and is configured to generate a first pressure signal indicative of fluid pressure at the first delivery port, and to generate a second pressure signal indicative of fluid pressure at the second delivery port when a controller receives an indication of a brake control signal and controls the pressure sensing solenoid.

One advantage is that fluid pressure sensing in a braking system is improved.

Another advantage is that fluid pressure sensing in a valve is performed with reduced parts and cost.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The described innovation relates to sensing pressure in a trailer control line and a trailer supply line using single pressure sensor, which provides cost savings and additional plausibility checking over conventional arrangements that require a separate pressure sensor for each line. For instance, a solenoid can be configured to provide a pressure signal from a supply line glad hand to the sensor under normal operating conditions. The solenoid is further configured to switch to providing a pressure signal from a control line glad hand upon the occurrence of a trigger event (e.g., such as a trailer break-away event or the like), which is detected by the solenoid when a change in supply line pressure changes by a predetermined amount or at a predetermined rate. In one embodiment, the supply line pressure change exceeds a predetermined rate threshold or a predetermined amount threshold, and this event acts as the trigger event that causes the solenoid to switch from providing the supply line pressure signal to providing the control line pressure signal.

Figure 1:
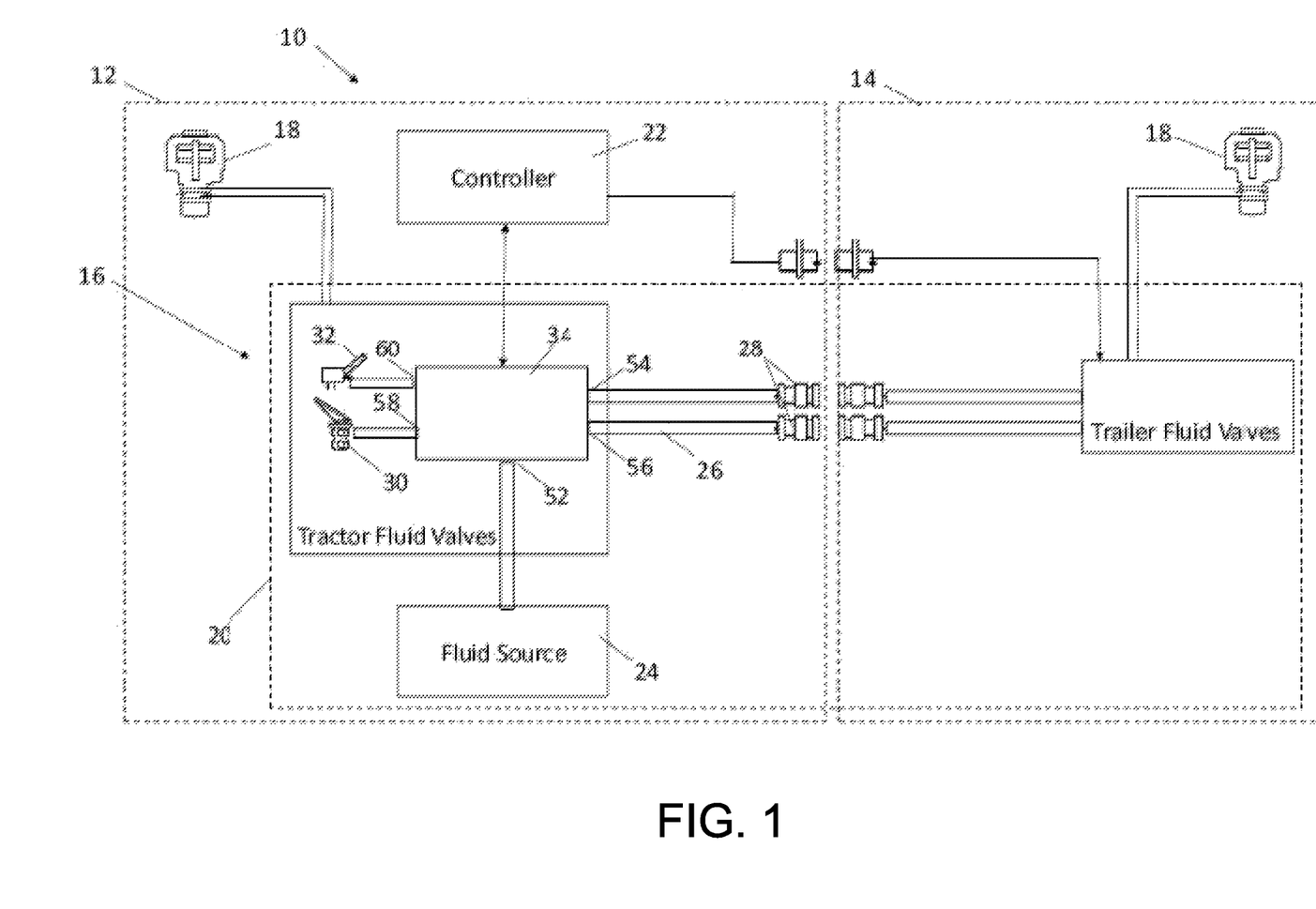
FIG. 1 is a diagrammatic representation of system for controlling wheel brakes on a tractor and trailer in accordance with one embodiment of the present teachings.

FIG. 1 illustrates a vehicle 10 containing a tractor or power unit 12 and one or more trailers or towed units 14. Tractor 12 contains a power unit, such as an internal combustion engine, and steering and drive axles each of which support one or more wheels at either end. Trailers 14 are provided to store freight and are detachably coupled to tractor 12. Each trailer 14 is supported on one or more trailer axles, each of which may support one or more wheels at either end. Although vehicle 10 includes a single trailer 14 in the illustrated embodiment, it should be understood that the number of trailers 14 attached to tractor 12 of vehicle 10 may vary.

Vehicle 10 further includes a braking system 16 configured to brakes wheels on tractor 12 and trailer 14 in order to slow or stop movement of vehicle 10. System 16 may include components on both tractor 12 and trailer 14 that may be in fluid and/or electrical communication using conventional connectors between tractor 12 and trailer 14. Braking system 16 may include wheel brakes 18, a fluid circuit 20 that supplies fluid pressure to wheel brakes 18, various sensors (not shown, but including transmission speed sensors, wheel speed sensors, pressure sensors, a steer angle sensor, a yaw rate sensor, and load sensors) and a controller 22.

Wheel brakes 18 are configured to apply a braking force to the vehicle wheels. In the illustrated embodiment, brakes 18 comprise disc brakes in which a carrier supports brake pads on opposite sides of a rotor rotating with the wheel and a brake actuator causes, responsive to fluid pressure delivered by fluid circuit 20, movement of a caliper relative to the carrier to move the brake pads into and out of engagement with the rotor. It should be understood, however, that one or more of wheel brakes 18 may alternatively comprise drum brakes in which the brake actuator causes, responsive to fluid pressure delivered by fluid circuit 20, movement of a cam or piston to move one or more brake shoes into engagement with a braking surface in a brake drum rotating with the vehicle wheel. Each wheel brake 18 defines a service brake. At least some of wheels brake 18 further define a parking or emergency brake. In one conventional wheel brake 18, the brake actuator includes a spring that forces a pushrod in a first direction to move the caliper (disc brake) or cam/piston (drum brake) to apply the parking/emergency brake. Fluid pressure may be supplied to the actuator to overcome the force of the spring and cause movement of the pushrod in a second direction to release the parking/emergency brake. Fluid pressure may then be applied to another portion of the actuator to again urge the pushrod in the first direction to apply the service brake.

Fluid circuit 20 generates fluid pressure within system 16 and controls the delivery of fluid pressure to the actuator of each wheel brake 18. Circuit 20 may include means for generating and storing pressurized fluid including a fluid source 24 and means for routing and delivering fluid pressure to wheel brakes 18 including fluid conduits 26, glad-hand connectors 28 between tractor 12 and trailer 14, and various valves including foot pedal valve 30, hand control valve 32, and a trailer control valve 34 in accordance with the present teachings. Although only valves 30, 32 and 34 are illustrated in FIG. 1, it should be understood that circuit 20 may further include other conventional valves including relay valves to increase the volume of fluid, and therefore the speed, at which fluid is delivered to, and exhausted from, wheel brakes 18 in order to eliminate lag times between the commanded and actual application and release of brakes 18, modulator valves that modulate fluid pressure delivered to wheel brakes 18 to implement anti-lock braking during a loss of traction, quick release valves to increase the speed at which fluid pressure is exhausted from wheel brakes 18 when brakes 18 are released, and a dash control valve that allows the vehicle operator to implement various functions including releasing parking brakes on tractor 12 or trailer 14 by supplying fluid pressure to oppose spring forces in the actuators for wheel brakes 18.

Fluid source 24 is provided to generate and store pressurized fluid. Fluid source 24 may include one or more fluid reservoirs for storing compressed fluid used in applying wheel brakes 18. Fluid source 24 may further include a compressor to draw in air and compress the air for delivery to the fluid reservoir or reservoirs. Fluid source 24 may further include one or more air dryers to collect and remove solid, liquid and vapor contaminants from pressurized fluid.

Fluid conduits 26 are used to transport fluid between fluid source 24, glad-hand connectors 28, valves 30, 32, 34 (and other valves not illustrated herein) and wheel brakes 18. Conduits 26 may be made from conventional metals and/or plastics and have connectors at either end configured to join the conduits 26 to corresponding components of circuit 20.

Glad-hand connectors 28 are used to transmit pressurized fluid from tractor 12 to trailer 14. One of connectors 28 is used to transmit fluid used to release the parking brake of each wheel brake 18 on trailer 14. The other connector 28 is used to transmit fluid used to apply the service brake of each wheel brake 18.

Foot pedal valve 30 is provided to allow controlled application of the brakes 18 by the vehicle operator by selectively releasing fluid pressure from fluid source 24. Valve 30 is supported within the cabin of tractor 12. Actuation of valve 30 by the vehicle operator allows fluid pressure to flow from fluid source 24 to various valves in fluid circuit 20 including trailer control valve 34. Valve 30 has fluid ports in fluid communication with fluid source 24 and trailer control valve 34.

Hand control valve 32 allows the vehicle operator to control the service brakes of the wheel brakes 18 on trailer 14 independently of the service brakes of the wheel brakes 18 on tractor 12. Valve 32 is supported within the cabin of tractor 12 and configured for actuation by hand. Actuation of valve 32 by the vehicle operator allows fluid pressure to flow from fluid source 24 to various valves in fluid circuit 20 involved in control of the wheel brakes 18 on trailer 14 including trailer control valve 34. Valve 32 therefore has fluid ports in fluid communication with fluid source 24 and trailer control valve 34.

Trailer control valve 34 transmits pneumatic signals relating to operation of the trailer wheel brakes 18 from the tractor 12 to the trailer 14. In accordance with one aspect of the present teachings, valve 34 also protects the fluid supply for tractor 12 in the event of a brake in the fluid connection between tractor 12 and trailer 14. In accordance with another aspect of the present teachings, valve 34 may also monitor the trailer supply and control fluid pressures, via a pressure sensing solenoid 35 and a single pressure sensor, to facilitate detection of the presence of trailers 14 coupled to the tractor 12.

Referring to FIGS. 2A-B, 3, and 4, valve 34 includes a body 36 and a relay valve 38 and may further include double check valve 40, electronically controlled valves 42, 44, 46, and a single pressure sensor 48. Body 36 provides structural support for, and positions and orients, the other components of valve 34 including relay valve 38, double check valve 40, electronically controlled valves 42, 44, 46, and pressure sensor 48. Body 36 protects these components against external objects and elements. Body 36 is also configured for mounting on tractor 12. Body 36 may be made from conventional metals or plastics. Body 36 defines a supply port 52, delivery ports 54, 56, and control ports 58, 60. Referring to FIG. 1, supply port 52 is configured for fluid communication with a fluid source on tractor 12 such as fluid source 24. Delivery port 54 is configured for fluid communication with a glad-hand connector 28 through which fluid is supplied from tractor 12 to trailer 14 to release the parking brakes in the wheel brakes 18 on trailer 14. In one embodiment, delivery port 54 is in fluid communication with supply port 52 such that fluid pressure at supply port 52 is routed directly to delivery port 54.

Referring again to FIG. 1, delivery port 56 is configured for fluid communication with the other glad-hand connector 28 through which fluid may be supplied from tractor 12 to trailer 14 for application of the service brakes in the wheel brakes 18 on trailer 14. Control ports 58, 60 are configured for fluid communication with control valves in tractor 12. In particular, control port 58 may be configured for fluid communication with foot pedal valve 30 while control port 60 may be configured for fluid communication with hand control valve 32.

Figure 2A:
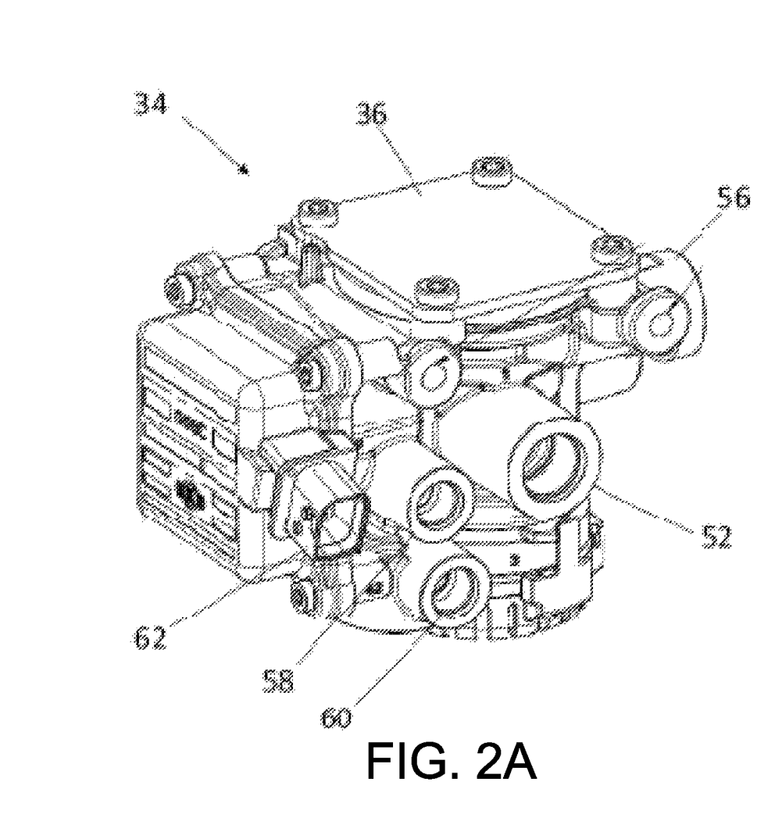
FIGS. 2A-2B are perspective and side views of a trailer control valve of the system of FIG. 1.
Figure 2B:
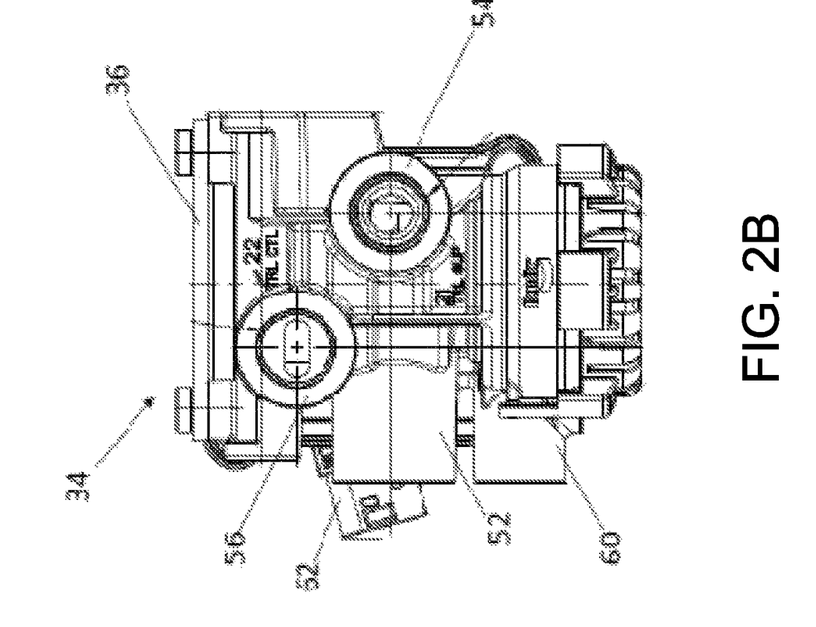
Figure 3:
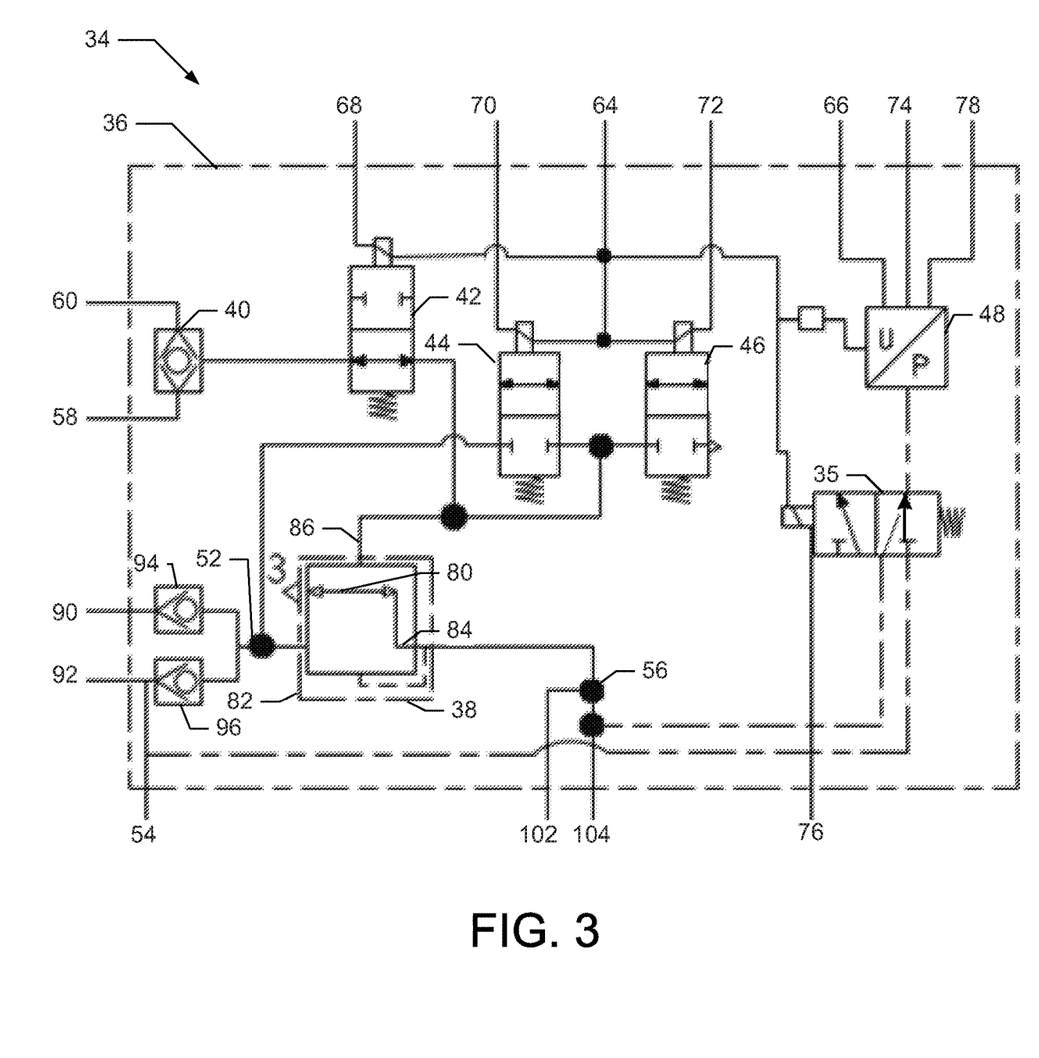
FIG. 3 is a diagrammatic representation of the trailer control valve of FIG. 2, wherein a pressure sensing solenoid is in a normal operating state.

Referring to FIGS. 2A-2B, body 36 further defines a terminal connector 62. Connector 62 defines a plurality of electrical terminals or pins for transmitting and/or receiving electrical signals. Valve 34 may communicate with controller 22 and other components and systems on vehicle 10 through connector 62 using a conventional vehicle communication bus such as a controller area network (CAN) (or another communication medium such as power line communication (PLC)). Referring to FIG. 3, in the illustrated embodiment, connector 62 defines eight terminals or pins with pin 64 providing power to a pressure sensing solenoid 35, valves 42, 44, 46 and pressure sensor 48, pin 66 acting as a ground, pins 68, 70, 72 receiving control signals for valves 42, 44, 46, pin 74 transmitting a pressure signal from sensor 48, pin 76 providing a reference voltage for the solenoid 35, and pin 78 providing a reference pressure sensor supply voltage for controller diagnostic purposes.

Referring to FIG. 3, relay valve 38 controls the delivery of fluid pressure from supply port 52 on body 36 to delivery port 56. Valve 38 includes a valve member 80 configured to move between a first position preventing fluid communication between supply port 52 and delivery port 56 and a second position permitting fluid communication between supply port 52 and delivery port 56. Valve 38 includes an inlet port 82, an outlet port 84 and a control port 86. Inlet port 82 is in fluid communication with supply port 52 of body 36. Outlet port 84 is in fluid communication with delivery port 56 of body 36. Control port 86 is configured for fluid communication with supply port 52 or one of control ports 58, 60 on body 36 depending on the positions of double check valve 40 and electronically controlled valves 42, 44, 46 as described in greater detail below. Control port 86 is therefore configured to receive pneumatic control signals from ports 52, 58, 60 that control movement of the valve member 80.

Double check valve 40 provides fluid from the highest pressure input among control ports 58, 60 to control port 86 of relay valve 38. In the absence of actuation of foot pedal valve 30 or hand control valve 32, fluid will not flow from either control port 58, 60 to control port 86 on relay valve 38 and (unless fluid flow is permitted from supply port 52 to control port 86 as discussed below), relay valve 38 will prevent fluid communication between supply port 52 and delivery port 56 on body 36. Actuation of one of pedal valve 30 or hand control valve 32 will create a pressure differential that opens check valve 40 and permits fluid flow from the corresponding control port 58, 60 to control port 86 on relay valve 38 (provided electronic control valve 42 is open as discussed below), causing valve member 80 to move to a position permitting fluid flow between inlet port 82 and outlet port 84 on relay valve 38 and, therefore, between supply port 52 and delivery port 56 on body 36 of valve 34. Double check valve 40 has inlet ports in fluid communication with control ports 58, 60 on body 36 and an outlet port in fluid communication with control port 86 of relay valve 38.

Electronically controlled valves 42, 44, 46 provide an alternative means to foot pedal valve 30 and hand control valve 32 for controlling relay valve 38. In the illustrated embodiment, valves 42, 44, 46 comprise solenoid valves. It should be understood, however, that valves 42, 44, 46 may assume other forms including motorized valves or piezo valves. Valve 42 is configured to control delivery of fluid pressure from control ports 58, 60 on body 36 to control port 86 on relay valve 38. Valves 44, 46 are configured to control delivery of fluid pressure from supply port 52 on body 36 to control port 86 on relay valve 38. Valve 42 is normally open and valves 44, 46 are normally closed to permit fluid flow from control ports 58, 60 on body 36 to control port 86 on relay valve 38 upon actuation of foot pedal valve 30 or hand control valve 32. In certain circumstances, however, it may be desirable to actuate the service brakes on trailer 14 in the absence of actuation of foot pedal valve 30 or hand control valve 32 including in operator controlled electronic braking systems, advanced driver assistance systems (ADAS) such as collision avoidance systems, adaptive cruise control systems and platooning systems. In these circumstances, signals may be generated by controller 22 or another system or component on vehicle 10 and delivered to valves 42, 44, 46 through pins 68, 70, 72 of connector 62 to close valve 42 and open valves 44, 46 and modulate and deliver fluid pressure from supply port 52 of body 36 to control port 86 of relay valve 38.

Sensor 48 is supported within body 36 of valve 34. Sensor 48 generates a pressure signal indicative of the fluid pressure received from solenoid 35. For instance, the solenoid 35 can be configured to provide a pressure signal from a supply line glad hand coupled to delivery port 54 to the sensor under normal operating conditions. The pressure sensing solenoid 35 is further configured to switch to providing a pressure signal from a control line glad hand coupled to delivery port 56 upon the occurrence of a trigger event (e.g., such as a trailer break-away event or the like), which is detected by the solenoid when a change in supply line pressure changes by a predetermined amount or at a predetermined rate. In one embodiment, the supply line pressure change exceeds a predetermined rate threshold or a predetermined threshold amount, and this magnitude change or rate of change acts as the trigger event that causes the solenoid to switch from providing the supply line pressure signal to providing the control line pressure signal to a pressure sensor in fluid communication with the solenoid 35.

In this manner, valve 34 advantageously allows monitoring of the fluid pressure in both fluid lines (control and supply) to trailer 14 (unlike conventional systems that measure pressure on only the control line) close to the physical connection with trailer 14 using a single pressure sensor 48. The measurement on both lines enables system 16 to provide accurate detection of the presence of trailer 14. Pressure sensor 48 outputs pressure signals on pin 74 of connector 62 and is also in electrical communication with pin 78 providing a reference pressure value and a pin 66 tied to electrical ground. Pin 76 senses a voltage on the solenoid 35.

Supply port 52 receives signal from each of a supply tank 90 and a trailer supply 92, via respective check valves 94, 96. Trailer supply 92 also provides signal directly to the trailer supply delivery port 54. This supply line is monitored by the herein-described pressure sensing solenoid 35 and single pressure sensor 48 arrangement during normal operating conditions. Delivery port 56 provides signal to each of a trailer control port 102, a stop light switch port 104, and the pressure sensing solenoid 35. This control line signal is monitored by the single pressure sensor 48 when the pressure sensing solenoid 35 switches over upon a trigger event such as a trailer breakaway or the like.

FIG. 3 thus illustrates the pressure sensing solenoid 35 in a normal operating state, in which the pressure sensing solenoid 35 passes pressure signal from the supply line from the trailer supply 92 to the pressure sensor 48, as indicated by the arrow in the pressure sensing solenoid 35 of FIG. 3.

Figure 4:
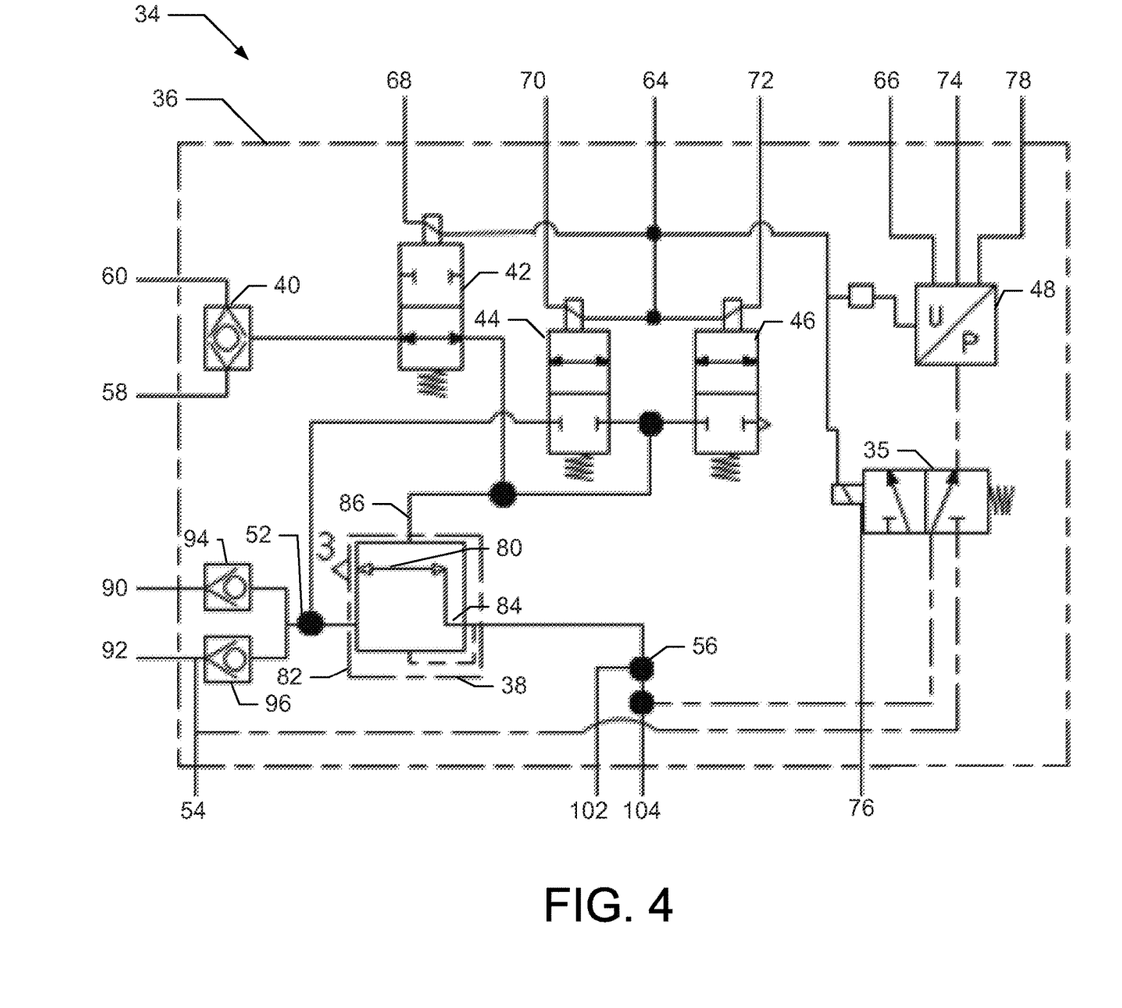
FIG. 4 is a diagrammatic representation of the trailer control valve of FIG. 2, wherein a pressure sensing solenoid is in an active state.

FIG. 4 illustrates the pressure sensing solenoid 35 in an active state, such as when the solenoid 35 switches to providing a pressure signal from the control line glad hand upon a trigger event such as a trailer breakaway, as indicated by the arrow in the pressure sensing solenoid 35 of FIG. 4. The valve 34 is configured in the same arrangement as that of FIG. 3, but shows that the pressure sensing solenoid 35 has shifted from passing trailer supply line signal (i.e., from the first delivery port 54, which is in direct fluid communication with the supply port 52) to passing trailer control line signal from the delivery port 56 of valve 38. The pressure sensing solenoid 35 selectively switches between transmitting fluid signal from the first and second delivery ports as a function of a brake control signal received by the controller, which controls the pressure sensing solenoid.

According to one example, the pressure sensor 48 receives fluid signal, via the pressure sensing solenoid, from the first delivery port 54/the supply port 92 when the fluid signal from the first delivery port is within a predetermined pressure range, such as between 70% and 100% (or some other suitable predetermined range) of a predetermined operating pressure for the trailer control valve, wherein the lower bound of the predetermined range represents a pressure drop consistent with a disconnected trailer supply glad hand. In one embodiment, the predetermined operating pressure is between about 85 psi and 120 psi. In one example, the pressure sensing solenoid 35 is configured to stop transmitting fluid signal from the first delivery port, and to begin transmitting fluid signal from the second delivery port, when the pressure of the fluid signal from the first delivery port is outside the predetermined range. In another example, the pressure sensing solenoid 35 is configured to stop transmitting fluid signal from the first delivery port, and to begin transmitting fluid signal from the second delivery port, when a brake control signal is received, such as from a tractor foot pedal or a tractor hand brake.

In another example, the pressure sensor receives fluid signal, via the pressure sensing solenoid, from the second delivery port 56 when the fluid signal from the first delivery port 54 is below a predetermined threshold pressure (e.g., a pressure threshold consistent with a trigger event such as a disconnected trailer supply glad hand). The pressure sensing solenoid 35 stops transmitting fluid signal from the first delivery port 54, and begins transmitting fluid signal from the second delivery port 56 to the pressure sensor 48, when the pressure of the fluid signal from the first delivery port 54 is below the predetermined threshold pressure. For instance, one or more controllers within the vehicle can request that the pressure be measured by the pressure sensor device 48, such that the pressor sensing solenoid 35 is signaled to switch positions of a valve member therein to be able to measure the desired fluid pressure. In one embodiment, the predetermined threshold pressure is a threshold pressure at the first delivery port 54 and is indicative of a disconnected trailer. The predetermined threshold pressure may be a discrete value that is a function of a particular vehicle or environment in which the valve 34 is employed, or may be a percentage of normal operation pressure (e.g., 50% or some other suitable predetermined percentage). It will be understood that the foregoing examples are presented by way of illustration and are not necessarily limited to the particular values or percentages discussed above.

Referring again to FIG. 1, controller 22 may be used to control the operation of various systems and components of vehicle 10. Controller 22 may, for example, be used to control braking and stability control systems in vehicle 10 by controlling the operation of various fluid control valves including relay valves and modulator valves. In accordance with one aspect of the present teachings, controller 22 may be provided to control the operation of trailer control valve 34. In accordance with another aspect, controller 22 may also detect the presence of a trailer 14 coupled to tractor 12 responsive to signals generated by valve 34 and, in particular, by pressure sensor 48. Controller 22 may comprise a programmable microprocessor or microcontroller or may comprise an application specific integrated circuit (ASIC). Controller 22 may include a memory and a central processing unit (CPU). Controller 22 may also include an input/output (I/O) interface including a plurality of input/output pins or terminals through which the controller may receive a plurality of input signals and transmit a plurality of output signals. The input signals may include signals received from a variety of sources providing information about the operation of vehicle 10 including, for example, various sensors such as wheel speed sensors, lateral acceleration sensors, steer angle sensors, brake pressure sensors, vehicle load sensors, yaw rate sensors, tire pressure management sensors, and collision avoidance sensors (which may comprise, for example, RADAR devices, LIDAR devices or cameras). The input signals may also include inputs from user interfaces through which the vehicle operator can input data regarding the vehicle 10 and/or direct the operation of vehicle 10. In accordance with present teachings, the input signals may further include signals generated by pressure sensor 48 in valve 34. The output signals may include signals transmitted to various vehicle control systems such as anti-lock braking and stability control systems and user interfaces on vehicle 10. In accordance with the present teachings, the output signals may further include signals generated to control electronically controlled valves 42, 44, 46 within valve 34. Controller 22 may communicate with other devices and systems within vehicle 10 over a conventional vehicle communication bus such as a controller area network (CAN) (or another communication medium such as power line communication (PLC)).

A trailer control valve 34 for a tractor 12 in accordance with the present teachings represent an improvement as compared to valves used in conventional tractor fluid control circuits. In particular, the valve 34 integrates functionality of a relay valve and a tractor protection valve to reduce part count, cost and complexity of the tractor fluid circuit 20 including the number of pneumatic connections. In some embodiments, the trailer control valve 34 also monitors the trailer supply and control fluid pressures to facilitate detection of the presence of trailers 14 coupled to the tractor 12.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A trailer control valve for a tractor, comprising:
a body defining a supply port and first and second delivery ports, the supply port configured for fluid communication with a fluid source on the tractor, the first delivery port in fluid communication with the supply port and configured for fluid communication with a first glad-hand connector through which fluid is supplied from the tractor to a trailer coupled to the tractor, the second delivery port configured for fluid communication with a second glad-hand connector through which fluid is supplied from the tractor to the trailer for trailer control; and,
a relay valve supported within the body, the relay valve including a valve member configured to move between a first position preventing fluid communication between the supply port and the second delivery port and a second position permitting fluid communication between the supply port and the second delivery port; and
a pressure sensing solenoid that receives a first fluid signal from the first delivery port and a second fluid signal from the second delivery port, and selectively transmits one of the first fluid signal from the first delivery port and the second fluid signal from the second delivery port as a function of a brake control signal received by a controller that controls the pressure sensing solenoid.

2. The trailer control valve of claim 1, further comprising a pressure sensor that receives the first fluid signal, via the pressure sensing solenoid, from the first delivery port when a valve member inside the pressure sensing solenoid is moved to a first position.

3. The trailer control valve of claim 1, wherein a predetermined pressure range for the pressure of first fluid signal from the first delivery port is between approximately 70% and 100% of a predetermined operating pressure for the trailer control valve, and wherein the pressure sensing solenoid is configured to stop transmitting the first fluid signal from the first delivery port, and to begin transmitting the second fluid signal from the second delivery port, when the pressure of the first fluid signal from the first delivery port is outside the predetermined range.

4. The trailer control valve of claim 1, wherein the pressure sensing solenoid is configured to stop transmitting the first fluid signal from the first delivery port, and to begin transmitting the second fluid signal from the second delivery port, when the brake control signal is received.

5. The trailer control valve of claim 1, wherein the pressure sensing solenoid stops transmitting the first fluid signal from the first delivery port, and begins transmitting the second fluid signal from the second delivery port to the pressure sensor, when the pressure of the first fluid signal is below a predetermined threshold pressure and when requested by another controller on the vehicle.

6. The trailer control valve of claim 5, wherein the predetermined threshold pressure is indicative of a disconnected trailer.

7. The trailer control valve of claim 1 wherein the body includes a first control port configured for fluid communication with a tractor control valve in the tractor and the relay valve includes an inlet port in fluid communication with the supply port, an outlet port in fluid communication with the second delivery port, and a control port configured for fluid communication with the first control port on the body and to receive a pneumatic control signal from the first control port that controls movement of the valve member between the first position and second position.

8. The trailer control valve of claim 7 wherein the tractor control valve comprises one of a foot pedal valve in the tractor and a hand control valve in the tractor.

9. The trailer control valve of claim 8 wherein the body includes a second control port configured for fluid communication with another of the foot pedal valve and the hand control valve and the control port of the relay valve is configured for fluid communication with the second control port on the body and to receive a pneumatic control signal from the second control port that controls movement of the valve member between the first position and the second position.

10. The trailer control valve of claim 9, further comprising a double check valve having a first inlet port in fluid communication with the first control port on the body, a second inlet port in fluid communication with the second control port on the body and an outlet port in fluid communication with the control port on the relay valve.

11. The trailer control valve of claim 7, further comprising a first electronically controlled valve supported within the body, the first electronically controlled valve including a valve member configured to move in response to a first electric signal received on a first terminal on the body between a first position preventing fluid communication between the first control port of the body and the control port of the relay valve and a second position permitting fluid communication between the first control port of the body and the control port of the relay valve.

12. The trailer control valve of claim 11, further comprising a second electronically controlled valve supported within the body, the second electronically controlled valve including a valve member configured to move in response to a second electric signal received on a second terminal on the body between a first position preventing fluid communication between the supply port of the body and the control port of the relay valve and a second position permitting fluid communication between the supply port of the body and the control port of the relay valve.

13. The trailer control valve of claim 7, further comprising an electronically controlled valve supported within the body, the electronically controlled valve including a valve member configured to move in response to an electric signal received on a terminal on the body between a first position preventing fluid communication between the supply port of the body and the control port of the relay valve and a second position permitting fluid communication between the supply port of the body and the control port of the relay valve.

14. A trailer control valve for a tractor, comprising:
a body defining a supply port and first and second delivery ports, the supply port configured for fluid communication with a fluid source on the tractor, the first delivery port in fluid communication with the supply port and configured for fluid communication with a first glad-hand connector through which fluid is supplied from the tractor to a trailer coupled to the tractor, the second delivery port configured for fluid communication with a second glad-hand connector through which fluid is supplied from the tractor to the trailer;
a relay valve supported within the body, the relay valve including a valve member configured to move between a first position preventing fluid communication between the supply port and the second delivery port and a second position permitting fluid communication between the supply port and the second delivery port;
a pressure sensing solenoid that receives a first fluid signal from the first delivery port and a second fluid signal from the second delivery port, and selectively transmits one of the first fluid signal from the first delivery port and the second fluid signal from the second delivery port as a function of the pressure of the fluid signal from the first delivery port;
a single pressure sensor in fluid communication with the pressure sensing solenoid and supported within the body and configured to generate a first pressure signal indicative of fluid pressure at the first delivery port and to generate a second pressure signal indicative of fluid pressure at the second delivery port when a controller receives an indication of a brake control signal and controls the pressure sensing solenoid.

15. The trailer control valve of claim 14 wherein the body includes a first control port configured for fluid communication with a control valve in the tractor and the relay valve includes an inlet port in fluid communication with the supply port, an outlet port in fluid communication with the second delivery port, and a control port configured for fluid communication with the first control port on the body and to receive a pneumatic control signal from the first control port that controls movement of the valve member between the first position and second position.

16. The trailer control valve of claim 15 wherein the control valve comprises one of a foot pedal valve in the tractor and a hand control valve in the tractor.

17. The trailer control valve of claim 16 wherein the body includes a second control port configured for fluid communication with another of the foot pedal valve and the hand control valve and the control port of the relay valve is configured for fluid communication with the second control port on the body and to receive a pneumatic control signal from the second control port that controls movement of the valve member between the first position and the second position.

18. The trailer control valve of claim 17, further comprising a double check valve having a first inlet port in fluid communication with the first control port on the body, a second inlet port in fluid communication with the second control port on the body and an outlet port in fluid communication with the control port on the relay valve.

19. The trailer control valve of claim 15, further comprising a first electronically controlled valve supported within the body, the first electronically controlled valve including a valve member configured to move in response to a first electric signal received on a first terminal on the body between a first position preventing fluid communication between the first control port of the body and the control port of the relay valve and a second position permitting fluid communication between the first control port of the body and the control port of the relay valve.

20. The trailer control valve of claim 19, further comprising a second electronically controlled valve supported within the body, the second electronically controlled valve including a valve member configured to move in response to a second electric signal received on a second terminal on the body between a first position preventing fluid communication between the supply port of the body and the control port of the relay valve and a second position permitting fluid communication between the supply port of the body and the control port of the relay valve.

21. The trailer control valve of claim 15, further comprising an electronically controlled valve supported within the body, the electronically controlled valve including a valve member configured to move in response to an electric signal received on a terminal on the body between a first position preventing fluid communication between the supply port of the body and the control port of the relay valve and a second position permitting fluid communication between the supply port of the body and the control port of the relay valve.

\* \* \* \* \*